US011580661B2

(12) United States Patent
Lee

(10) Patent No.: US 11,580,661 B2
(45) Date of Patent: Feb. 14, 2023

(54) DEVICE, METHOD AND SYSTEM FOR ESTIMATING ELEVATION IN IMAGES FROM CAMERA DEVICES

(71) Applicant: MOTOROLA SOLUTIONS, INC., Chicago, IL (US)

(72) Inventor: Chia Ying Lee, Chicago, IL (US)

(73) Assignee: MOTOROLA SOLUTIONS, INC., Chicago, IL (US)

(*) Notice: Subject to any disclaimer, the term of this patent is extended or adjusted under 35 U.S.C. 154(b) by 220 days.

(21) Appl. No.: 17/101,359

(22) Filed: Nov. 23, 2020

(65) Prior Publication Data

US 2022/0164976 A1 May 26, 2022

(51) Int. Cl.
G06T 7/70 (2017.01)
G06T 7/50 (2017.01)
G06V 40/10 (2022.01)

(52) U.S. Cl.
CPC .......... G06T 7/70 (2017.01); G06T 7/50 (2017.01); G06V 40/10 (2022.01); G06T 2207/10016 (2013.01); G06T 2207/30196 (2013.01)

(58) Field of Classification Search
CPC ... G06T 7/70; G06T 7/50; G06T 2207/10016; G06V 40/10
See application file for complete search history.

(56) References Cited

U.S. PATENT DOCUMENTS

| 9,892,340 B2 * | 2/2018 | Fournier ............. G06K 9/6217 |
| 10,740,875 B1 * | 8/2020 | Burgett .................... G06T 3/60 |
| 2009/0028384 A1 * | 1/2009 | Bovyrin ................ G06V 20/00 382/103 |
| 2009/0238407 A1 * | 9/2009 | Tasaki ...................... G06T 7/73 382/103 |

(Continued)

FOREIGN PATENT DOCUMENTS

JP 2007208745 A * 8/2007

OTHER PUBLICATIONS

R. O. Chavez-Garcia, J. Guzzi, L. M. Gambardella and A. Giusti, "Learning Ground Traversability From Simulations," in IEEE Robotics and Automation Letters, vol. 3, No. 3, pp. 1695-1702, July (Year: 2018).*

(Continued)

Primary Examiner — Shaghayegh Azima
(74) Attorney, Agent, or Firm — Perry + Currier, Inc.

(57) ABSTRACT

A device, method and system for estimating elevation in images from camera devices is provided. The device detects humans at respective positions in images from a camera device, the camera device having a fixed orientation and fixed focal length. The device estimates, for the humans in the images, respective elevations of the humans, relative to the camera device, at the respective positions based at least on camera device parameters defining the fixed orientation and the fixed focal length. The device associates the respective elevations with the respective positions in the images. The device determines, using the respective elevations asso- (Continued)

ciated with the respective positions, a function that estimates elevation in an image from the camera device, using a respective image position coordinate as an input. The device provides the function to a video analytics engine to determine relative real-world positions in subsequent images from the camera device.

19 Claims, 7 Drawing Sheets

(56) References Cited

U.S. PATENT DOCUMENTS

| | | | |
|---|---|---|---|
| 2011/0024611 A1* | 2/2011 | Cunningham | H01L 27/14601 |
| | | | 250/252.1 |
| 2018/0075593 A1* | 3/2018 | Wang | G06T 7/85 |
| 2018/0301031 A1* | 10/2018 | Naamani | G08G 1/096861 |
| 2019/0158716 A1* | 5/2019 | Kerr | G06T 7/13 |
| 2020/0008503 A1* | 1/2020 | Nielson | A41H 5/02 |
| 2021/0019914 A1* | 1/2021 | Lipchin | G06V 20/52 |
| 2022/0028114 A1* | 1/2022 | Lee | G06T 7/521 |
| 2022/0061211 A1* | 3/2022 | Karst | A01D 34/008 |

OTHER PUBLICATIONS

Knorr, Moritz, et al., "Online Extrinsic Multi-Camera Calibration Using Ground Plane Induced Homographies", IEEE Intelligent Vehicles Symposium, Gold Coast, Australia, Jun. 2013, pp. 236-241.

Junejo, Imran N., "Camera Calibration for Unevren Terrains by Observing Pedestrians" 2008 19th International Conference on Pattern Recognition, Tampa, FL, 2008, pp. 1-4, doi: 10.1109/ICPR.2008.4761481.

Nie, Yinyu, et al., "Total 3D Understanding: Joint Layout, Object Pose and Mesh Reconstruction for Indoor Scenes From a Single Image", Proceedings of the IEEE/CVF Conference on Computer Vision and Pattern Recognition (CVPR) Jun. 2020 pp. 1-14 (also found here: https://web.archive.org/web/20200919075557/https://arxiv.org/abs/2002.12212).

* cited by examiner

DEVICE, METHOD AND SYSTEM FOR ESTIMATING ELEVATION IN IMAGES FROM CAMERA DEVICES

BACKGROUND OF THE INVENTION

Video analytics engines may be used to analyze images from camera devices to determine, for example, real-world feet-to-head heights of humans in the images and/or distances between humans in the images. Such analysis become more challenging when the terrain on which the humans are positioned, in the images, is not level.

BRIEF DESCRIPTION OF THE SEVERAL VIEWS OF THE DRAWINGS

The accompanying figures, where like reference numerals refer to identical or functionally similar components throughout the separate views, together with the detailed description below, are incorporated in and form part of the specification, and serve to further illustrate embodiments of concepts that include the claimed invention, and explain various principles and advantages of those embodiments.

Figure 1:
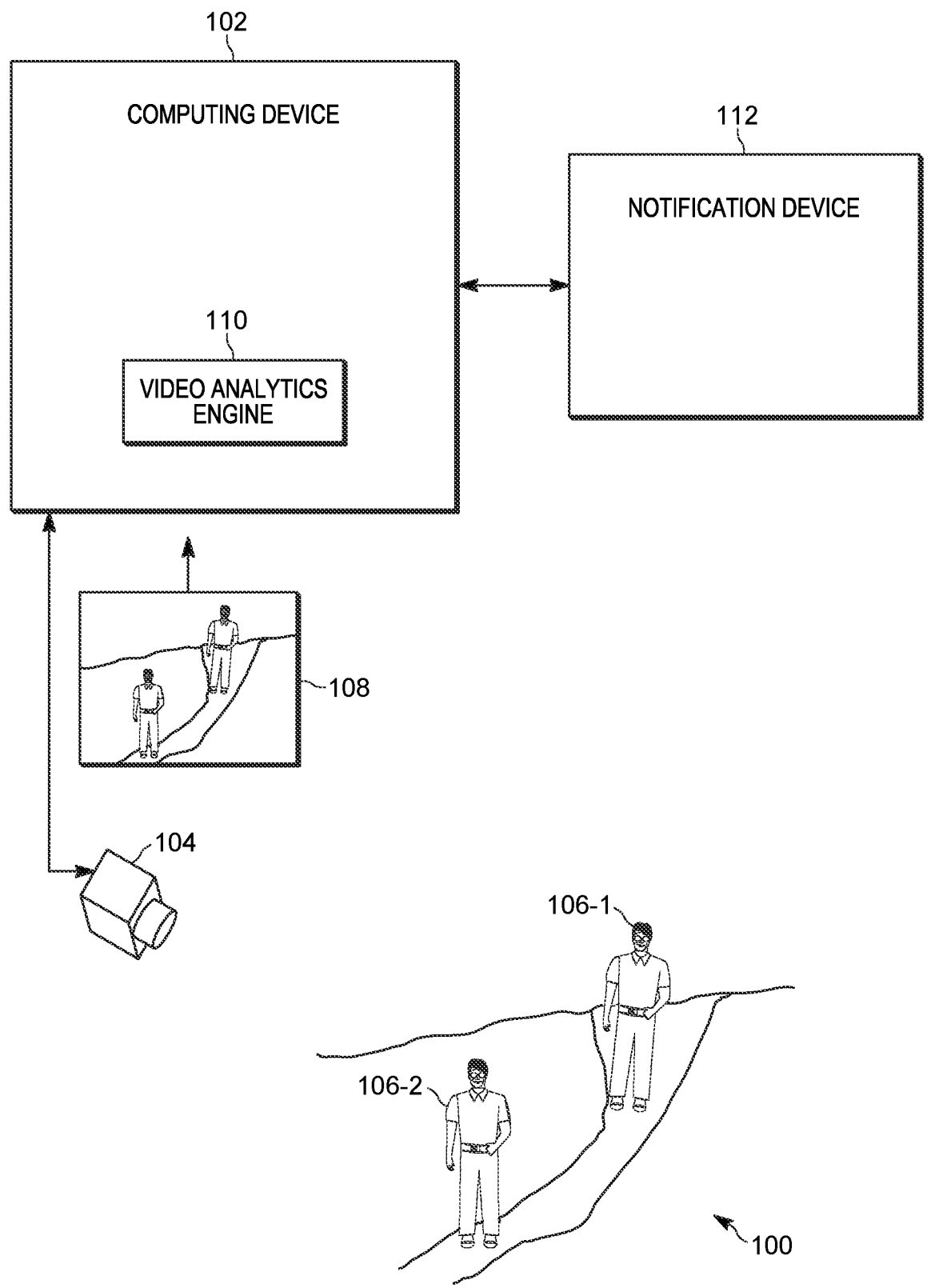
FIG. 1 is a system for estimating elevation in images from camera devices, in accordance with some examples.

The system, apparatus, and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

Video analytics engines may be used to analyze images from camera devices to determine, for example, real-world feet-to-head heights of humans in the images and/or distances between humans in the images. Such analysis become more challenging when the terrain on which the humans are positioned, in the images, is not level. Thus, there exists a need for an improved technical method, device, and system for estimating elevation in images from camera devices.

Provided herein is a computing device that receives images from a fixed position, fixed focal length camera device. The computing device may be located at the camera device and/or the computing device may be separate from the camera device. The computing device is generally configured to detect positions of humans in the images at respective positions (e.g. at image coordinate positions) and estimate respective elevations of the humans (e.g. real world relative elevations), relative to the camera device, at the respective positions based at least on camera device parameters defining a fixed orientation and a fixed focal length of the camera device. The estimate of the respective elevations of the humans, relative to the camera device, at the respective positions may occur using given functions which are provisioned at the computing device, and which may rely on bounding boxes and known camera parameters, also provisioned at the computing device. The given functions may hence generally yield relative real-world locations of the humans, relative to the camera deice, including the respective relative real-world elevations of the humans relative to the camera device, for example elevations of feet of the humans relative to the camera device (e.g. as the feet of the humans are located at the terrain).

The computing device associates such relative real-world elevations of the humans with respective positions (e.g. at image coordinate positions) of the humans in the images, which are used to determine a function that estimates elevation in an image from the camera device, using a respective image position coordinate as an input. The function may be a deterministic function and/or a stochastic process function (e.g. a Gaussian process) which receives, as input, an image coordinate position, and outputs a corresponding elevation. The function may be refined over time, for example, as more images, from the camera device, that include humans are received at the computing device over time. The function may be more accurate for regions of the images in which relatively more humans appear, over time as compared to regions in which relatively few (and/or no) humans appear over time. However, the function may be used to estimate elevation throughout the images.

An aspect of the present specification provides a method comprising: detecting, at a computing device, humans at respective positions in images from a camera device, the camera device having a fixed orientation and fixed focal length; estimating, at the computing device, for the humans in the images, respective elevations of the humans, relative to the camera device, at the respective positions based at least on camera device parameters defining the fixed orientation and the fixed focal length; associating, at the computing device, the respective elevations with the respective positions in the images; determining, at the computing device, using the respective elevations associated with the respective positions, a function that estimates elevation in an image from the camera device, using a respective image position coordinate as an input; and providing the function to a video analytics engine to determine relative real-world positions in subsequent images from the camera device.

Another aspect of the present specification provides a device comprising: a controller communicatively coupled to a camera device, the controller configured to: detect humans at respective positions in images from the camera device, the camera device having a fixed orientation and fixed focal length; estimate, for the humans in the images, respective elevations of the humans, relative to the camera device, at the respective positions based at least on camera device parameters defining the fixed orientation and the fixed focal length; associate the respective elevations with the respective positions in the images; determine, using the respective elevations associated with the respective positions, a function that estimates elevation in an image from the camera device, using a respective image position coordinate as an input; and provide the function to a video analytics engine to determine relative real-world positions in subsequent images from the camera device.

Each of the above-mentioned examples will be discussed in more detail below, starting with example system and device architectures of the system in which the embodiments may be practiced, followed by an illustration of processing blocks for achieving an improved technical method, device, and system for estimating elevation in images from camera devices.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the drawings.

Attention is directed to FIG. 1, which depicts an example system 100 for estimating elevation in images from camera devices. The various components of the system 100 are in communication via any suitable combination of wired and/or wireless communication links, and communication links between components of the system 100 are depicted in FIG. 1, and throughout the present specification, as double-ended arrows between respective components; the communication links may include any suitable combination of wireless and/or wired links and/or wireless and/or wired communication networks.

The system 100 comprises a computing device 102 (e.g. hereafter referred to interchangeably as the device 102) which is in communication with a camera device 104 having a fixed orientation and fixed focal length. The camera device 104 is generally positioned to image a region 105 that includes an elevation. As depicted the elevation is due to unlevel terrain, such as a hill, and two humans 106-1, 106-2 are at different positions on the unlevel terrain, and hence at different elevations relative to the camera device 104. Hereafter the humans 106-1, 106-2 will be interchangeably referred to, collectively, as the humans 106 and, generically, as a human 106; this convention will be used throughout the present specification.

While two humans 106 are shown on the unlevel terrain at the same time, as few as one human 106 may be on the unlevel terrain at any given time and/or more than two humans 106 may be on the unlevel terrain at any given time. Furthermore, while the elevation in the region 105 imaged by the camera device 104 is due to unlevel terrain of a hill, the elevation may be due to any suitable unlevel terrain which may comprise any suitable geographic and/or human-made features, such as steps, railway platforms adjacent railway tracks, curbs and streets, and the like.

Regardless of how the elevation occurs in the region 105 imaged by the camera device 104, and regardless of the number of humans 106, the camera device 104 captures and/or acquires images 108 of the region 105 and provides the images 108 to the computing device 102.

As depicted, the computing device 102 includes a video analytics engine 110, and is in further communication with a notification device 112. The video analytics engine 110, when suitably enabled, as described below, may be used to determine to determine a relative real-world position of humans 106 in the images 108 and/or respective elevations thereof and/or distances therebetween, and the like, based at least in part on an elevation of terrain in the images 108. The video analytics engine 110 may be further enabled to provide notifications of one or more of such determinations to the notification device 112. However, initially, the video analytics engine 110 may not be enabled to make such determinations based, at least in part, on an elevation of terrain in the images 108.

Hence, in an initial provisioning mode, described hereafter, the computing device 102 may be configured to determine a function that estimates elevation as a function of image position coordinates in images received from the camera device 104. For example, the computing device 102 may be configured to estimate, for the humans 106 in the images 108, respective elevations of the humans 106 (e.g. real-world relative elevations), relative to the camera device 104, at respective positions of the humans 106, based at least on camera device parameters defining the fixed orientation and the fixed focal length of the camera device 104. The computing device 102 may be further configured to: using the respective elevations associated with the respective positions, determine the function that estimates elevation (e.g. of terrain) in an image 108 from the camera device 104, using a respective image position coordinate (e.g. pixels, measurement units, such as millimeters, and the like). Such a function may be provided to the video analytics engine 110 to make determinations about humans 106 in images 108 from the camera device 104.

Details of components of the system 100 are next described.

The device 102 may comprise a computing device that is remote (e.g. as depicted) or local to the camera device 104 (e.g. at the camera device 104 and/or combined with the camera device 104). When remote from the camera device 104, the device 102 may be configured to receive images from a plurality of camera devices to determine respective functions therefor, which estimates elevation as a function of image position coordinates in images received from respective camera devices; in such examples, the device 102 may make determinations about humans in images from the plurality of camera devices using the video analytics engine 110 and the respective functions.

In examples that include a plurality of camera devices, the functionality of the device 102 and/or the video analytics engine 110 may be combined with each of the plurality of camera devices. However, the functionality of the device 102 and/or the video analytics engine 110 may be distributed between the device 102 and the camera device 104 and/or a plurality of camera devices. More specific functionality of the device 102 is described below.

The camera device 104 may comprise a digital camera device, a video camera device, and the like, that acquires electronic images, periodically and/or in response to motion and/or objects being detected in a field-of-view thereof (e.g. via a motion sensor and/or an object sensor, and the like, not depicted), and/or on demand, and/or in any other suitable manner. The camera device 104 may comprise a CCD (charge coupled device) based camera device and/or CMOS (complementary metal-oxide-semiconductor) based camera device, and the like.

However, it is understood that the camera device 104 is generally in a fixed position and has a fixed focal length, and parameters defining such have been provisioned at the computing device 102; for example, such parameters may include but are not limited to, at least a pitch value of the camera device 104, a roll value of the camera device 104 and a fixed focal length value of the camera device 104. Such camera parameters may be provisioned at the computing device 102 in conjunction with an installation of the camera device 104. Alternatively, such camera parameters may be provisioned at the computing device 102 in a calibration procedure once the camera device 104 is installed at the region 105. Furthermore, the camera parameters may include a real world elevation of the camera device 104 relative to a portion of the region 105, though, as will be described below, the elevation of the camera device 104 may be set to "0", with elevations of the humans 106 determined relative to the elevation of the camera device 104, as described below.

Furthermore, while the camera device 104 is depicted as being above the humans 106 on the unlevel terrain (e.g., mounted on a pole, a building, and the like, not depicted) the camera device 104 may be at any suitable location in which the humans 106 are imaged on the unlevel terrain. It is understood, however, that when the camera device 104 is above the humans 106, and an elevation of the camera device 104 is set to "0", respective elevations of the humans 106 may comprise negative values relative to the camera device 104.

The notification device 112, which may be optional, may comprise a terminal and/or mobile device, and the like of a dispatcher (e.g. for first responders) and/or a security guard and/or home owner, and/or any user tasked with monitoring the region 105 imaged by the camera device 104. The notification device 112 may comprise a visual notification device (e.g. such as a display screen) and/or an audio notification device (e.g. such as a speaker) and/or a haptic notification device, and the like.

Figure 2:
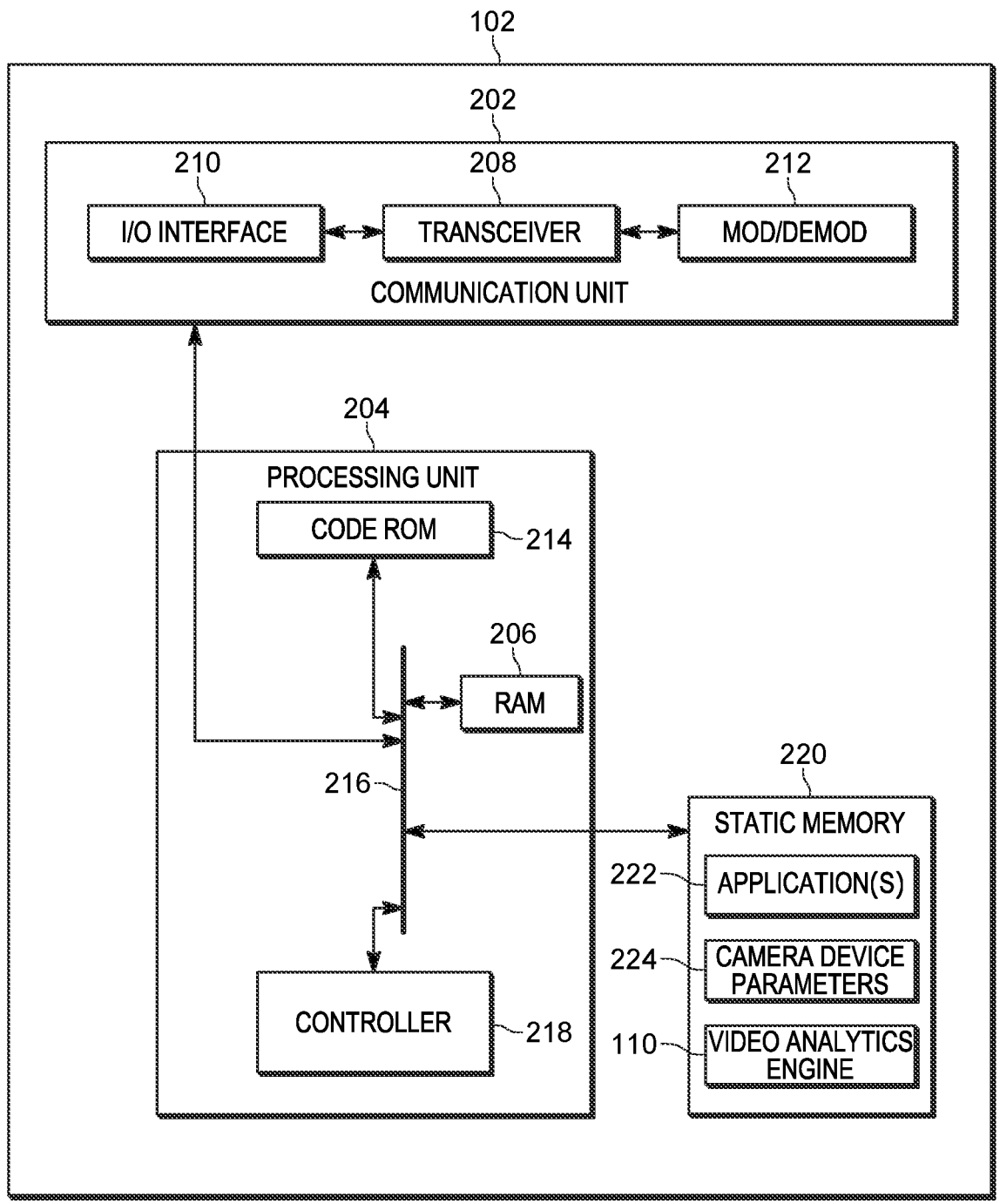
FIG. 2 is a device diagram showing a device structure of a device for estimating elevation in images from camera devices, in accordance with some examples.

Attention is next directed to FIG. 2 which depicts a schematic block diagram of an example of the device 102. In general, the device 102 may comprise a device remote and/or local to the camera device 104 and/or, in some examples, the device 102 may be combined with the camera device 104 and/or any other suitable device of the system 100, such as the notification device 112. When the device 102 is remote from the camera device 104, the device 102 may comprise one or more servers and/or cloud computing devices, and the like.

As depicted, the device 102 comprises: a communication unit 202, a processing unit 204, a Random-Access Memory (RAM) 206, one or more wireless transceivers 208 (which may be optional), one or more wired and/or wireless input/output (I/O) interfaces 210, a combined modulator/demodulator 212, a code Read Only Memory (ROM) 214, a common data and address bus 216, a controller 218, and a static memory 220 storing at least one application 222. Hereafter, the at least one application 222 will be interchangeably referred to as the application 222. Furthermore, while the memories 206, 214 are depicted as having a particular structure and/or configuration, (e.g. separate RAM 206 and ROM 214), memory of the device 102 may have any suitable structure and/or configuration.

As depicted, the static memory 220 further stores camera device parameters 224 and a module corresponding to the video analytics engine 110. The camera device parameters 224 are understood to define the fixed orientation and the fixed focal length of the camera device 104 and may include, but are not limited to, at least a pitch value of the camera device 104, a roll value of the camera device 104 and a fixed focal length value of the camera device 104. For example, a pitch value is understood to define an angle of the camera device 104 relative to, for example, level ground, and the roll value may define a rotational angle of the camera device 104 around, for example, a longitudinal axis and/or normal axis of a front lens of the camera device 104. The fixed focal length of the camera device 104 is understood to define an angular field-of-view of the camera device 104. The camera device parameters 224 may further comprise an elevation of the camera device 104 set to "0".

While the video analytics engine 110 is depicted as separate from the application 222, the video analytics engine 110 and the application 222 may be combined and/or the video analytics engine 110 and the application 222 may share functionality. For example, as will be described below, the device 102 may estimate planar coordinates and/or real world locations of the humans 106 relative to the camera device 104 using given functions which may be provisioned at one or more of the video analytics engine 110 and the application 222, and/or the video analytics engine 110 and the application 222 may share modules which implement such given functions. Examples of such given functions are described below with respect to Equation (1), Equation (2), Equation (3), Equation (4), Equation (5), and Equation (6).

While not depicted, the device 102 may include one or more of an input device and a display screen and the like.

As shown in FIG. 2, the device 102 includes the communication unit 202 communicatively coupled to the common data and address bus 216 of the processing unit 204.

The processing unit 204 may include the code Read Only Memory (ROM) 214 coupled to the common data and address bus 216 for storing data for initializing system components. The processing unit 204 may further include the controller 218 coupled, by the common data and address bus 216, to the Random-Access Memory 206 and the static memory 220.

The communication unit 202 may include one or more wired and/or wireless input/output (I/O) interfaces 210 that are configurable to communicate with other components of the system 100. For example, the communication unit 202 may include one or more transceivers 208 and/or wireless transceivers for communicating with other suitable components of the system 100. Hence, the one or more transceivers 208 may be adapted for communication with one or more communication links and/or communication networks used to communicate with the other components of the system 100. For example, the one or more transceivers 208 may be adapted for communication with one or more of the Internet, a digital mobile radio (DMR) network, a Project 25 (P25) network, a terrestrial trunked radio (TETRA) network, a Bluetooth network, a Wi-Fi network, for example operating in accordance with an IEEE 802.11 standard (e.g., 802.11a, 802.11b, 802.11g), an LTE (Long-Term Evolution) network and/or other types of GSM (Global System for Mobile communications) and/or 3GPP ($3^{rd}$ Generation Partnership Project) networks, a 5G network (e.g. a network architecture compliant with, for example, the 3GPP TS 23 specification series and/or a new radio (NR) air interface compliant with the 3GPP TS 38 specification series) standard), a Worldwide Interoperability for Microwave Access (WiMAX) network, for example operating in accordance with an IEEE 802.16 standard, and/or another similar type of wireless network. Hence, the one or more transceivers 208 may include, but are not limited to, a cell phone transceiver, a DMR transceiver, P25 transceiver, a TETRA transceiver, a 3GPP transceiver, an LTE transceiver, a GSM transceiver, a 5G transceiver, a Bluetooth transceiver, a Wi-Fi transceiver, a WiMAX transceiver, and/or another similar type of wireless transceiver configurable to communicate via a wireless radio network.

The communication unit 202 may further include one or more wireline transceivers 208, such as an Ethernet transceiver, a USB (Universal Serial Bus) transceiver, or similar transceiver configurable to communicate via a twisted pair wire, a coaxial cable, a fiber-optic link, or a similar physical connection to a wireline network. The transceiver 208 may also be coupled to a combined modulator/demodulator 212.

The controller 218 may include ports (e.g. hardware ports) for coupling to other suitable hardware components of the system 100.

The controller 218 may include one or more logic circuits, one or more processors, one or more microprocessors, and/or the controller 218 may include one or more ASIC (application-specific integrated circuits) and one or more FPGA (field-programmable gate arrays), and/or another electronic device. In some examples, the controller 218 and/or the computing device 102 is not a generic controller and/or a generic device, but a device specifically configured to implement functionality for estimating elevation in images from camera devices. For example, in some examples, the computing device 102 and/or the controller 218 specifically comprises a computer executable engine configured to implement functionality for estimating elevation in images from camera devices. In particular, the video analytics engine 110 is an example of such an engine.

The static memory 220 comprises a non-transitory machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random-access memory ("RAM")). In the example of FIG. 2, programming instructions (e.g., machine readable instructions) that implement the functional teachings of the computing device 102 as described herein are maintained, persistently, at the memory 220 and used by the controller 218, which makes appropriate utilization of volatile storage during the execution of such programming instructions.

Figure 3:
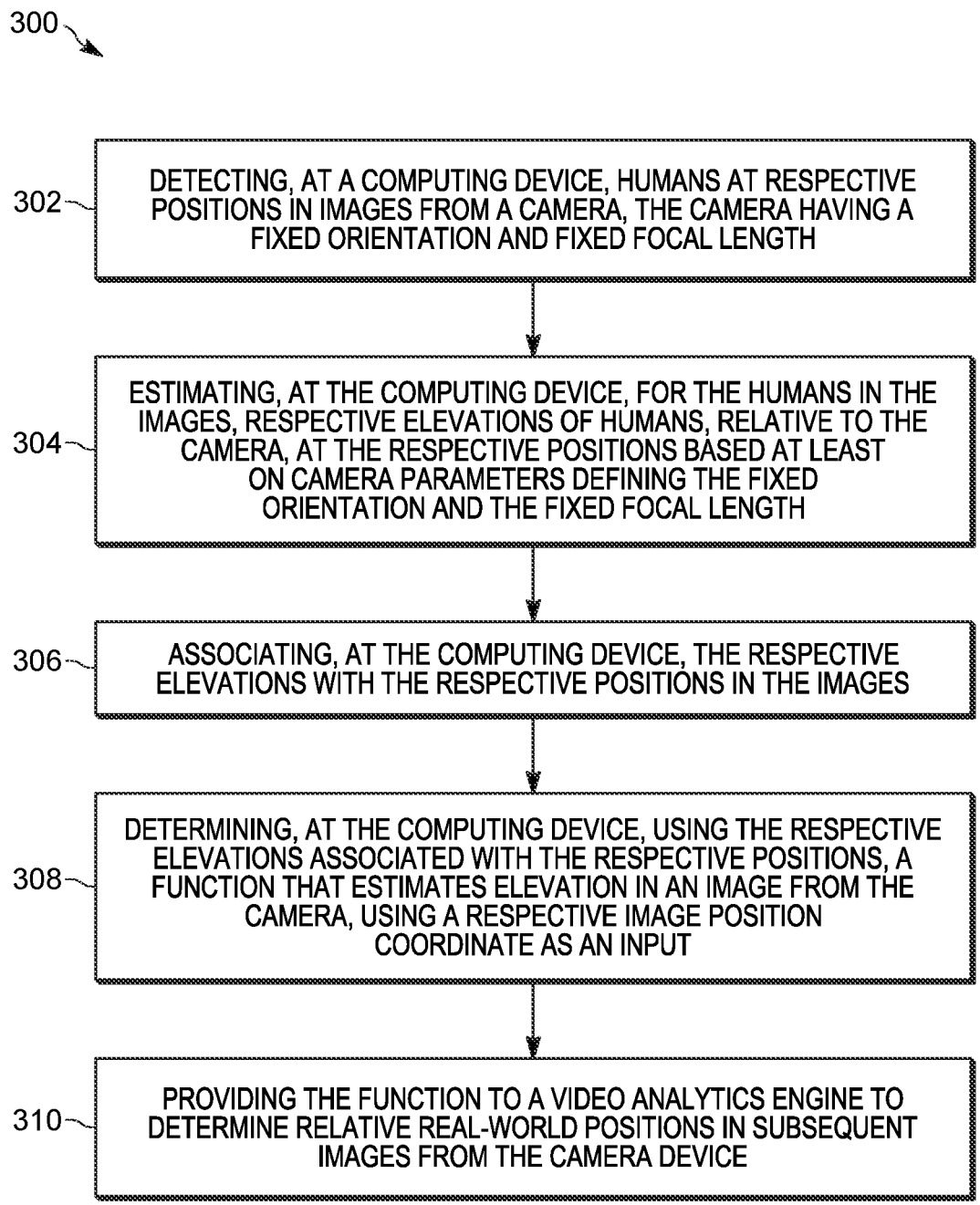
FIG. 3 is a flowchart of a method for estimating elevation in images from camera devices, in accordance with some examples.

In particular, the memory 220 stores instructions corresponding to the at least one application 222 that, when executed by the controller 218, enables the controller 218 to implement functionality for estimating elevation in images from camera devices, including but not limited to, the blocks of the methods set forth in FIG. 3.

In illustrated examples, when the controller 218 executes the one or more applications 222, the controller 218 is enabled to: detect humans at respective positions in images from a camera device, the camera device having a fixed orientation and fixed focal length; estimate respective elevations of the humans, relative to the camera device, at the respective positions based at least on camera device parameters defining the fixed orientation and the fixed focal length; associate the respective elevations with the respective positions in the images; determine, using the respective elevations associated with the respective positions, a function that estimates elevation in an image from the camera device, using a respective image position coordinate as an input; and provide the function to a video analytics engine to determine relative real-world positions in subsequent images from the camera device.

The application 222 may include programmatic algorithms, and the like, to implement functionality as described herein.

Alternatively, and/or in addition to programmatic algorithms, the application 222 may include one or more machine learning algorithms to implement functionality as described herein. The one or more machine learning models and/or algorithms of the application 222 may include, but are not limited to: a deep-learning based algorithm; a neural network; a generalized linear regression algorithm; a random forest algorithm; a support vector machine algorithm; a gradient boosting regression algorithm; a decision tree algorithm; a generalized additive model; evolutionary programming algorithms; Bayesian inference algorithms, reinforcement learning algorithms, and the like. However, generalized linear regression algorithms, random forest algorithms, support vector machine algorithms, gradient boosting regression algorithms, decision tree algorithms, generalized additive models, and the like may be preferred over neural network algorithms, deep learning algorithms, evolutionary programming algorithms, and the like, in some security environments (e.g. which may be the situation when the camera device 104 is used as a security camera). Any suitable machine learning algorithm and/or deep learning algorithm and/or neural network is within the scope of present examples.

Attention is now directed to FIG. 3 which depicts a flowchart representative of a method 300 for estimating elevation in images from camera devices. The operations of the method 300 of FIG. 3 correspond to machine readable instructions that are executed by the device 102, and specifically the controller 218 of the device 102. In the illustrated example, the instructions represented by the blocks of FIG. 3 are stored at the memory 220 for example, as the application 222. The method 300 of FIG. 3 is one way in which the controller 218 and/or the computing device 102 and/or the system 100 may be configured. Furthermore, the following discussion of the method 300 of FIG. 3 will lead to a further understanding of the system 100, and its various components.

The method 300 of FIG. 3 need not be performed in the exact sequence as shown and likewise various blocks may be performed in parallel rather than in sequence. Accordingly, the elements of method 300 are referred to herein as "blocks" rather than "steps.", for example a block 302, a block 304, a block 306 and a block 308. The method 300 of FIG. 3 may be implemented on variations of the system 100 of FIG. 1, as well.

At a block 302, the controller 218 and/or the device 102 detects the humans 106 at respective positions in the images 108 from the camera device 104. In some examples, the detection may occur in images 108 that are received "live" from the camera device 104 (e.g. as the images 108 are received). However, in other examples, the detection may occur in images 108 that were previously received from the camera device 104 and stored at a memory (not depicted). Put another way, the detecting humans 106 in the images 108 from the camera device 104 may occur as the images 108 are received and/or may occur using stored images 108. As has already been described, the camera device 104 has a fixed orientation and fixed focal length as defined by the camera device parameters 224.

In some examples, the respective positions may comprise to respective image coordinates of positions of feet of the humans 106 in the images 108 (e.g. feet image coordinates).

Hence, it is understood that such respective positions in the images 108 refer to image positions and/or image coordinates, and not real-world positions and the like. For example, an image 108 may be assigned an abscissa and/or x-axis along a "bottom" of the image 108, and an ordinate and/or y-axis along a side of the image 108 perpendicular to the abscissa. Hence, herein, respective positions in the images 108 may be understood to include (x,y) pairs of coordinates in the images 108 for example in units of pixels of the image 108 and/or millimeters (e.g. "x" and "y" lengths of the images 108) and the like.

In some examples, the controller 218 and/or the device 102 detects the humans 106 at respective positions in the images 108 using bounding boxes and may further include determining head image coordinates and feet image coordinates of the humans in the bounding boxes, as described below with respect to FIG. 4 and FIG. 5. In particular, a determined (x,y) position of the humans 106 in the images 108 may correspond to a position of feet image coordinates in and/or at a bounding box in the images 108.

Figure 6:
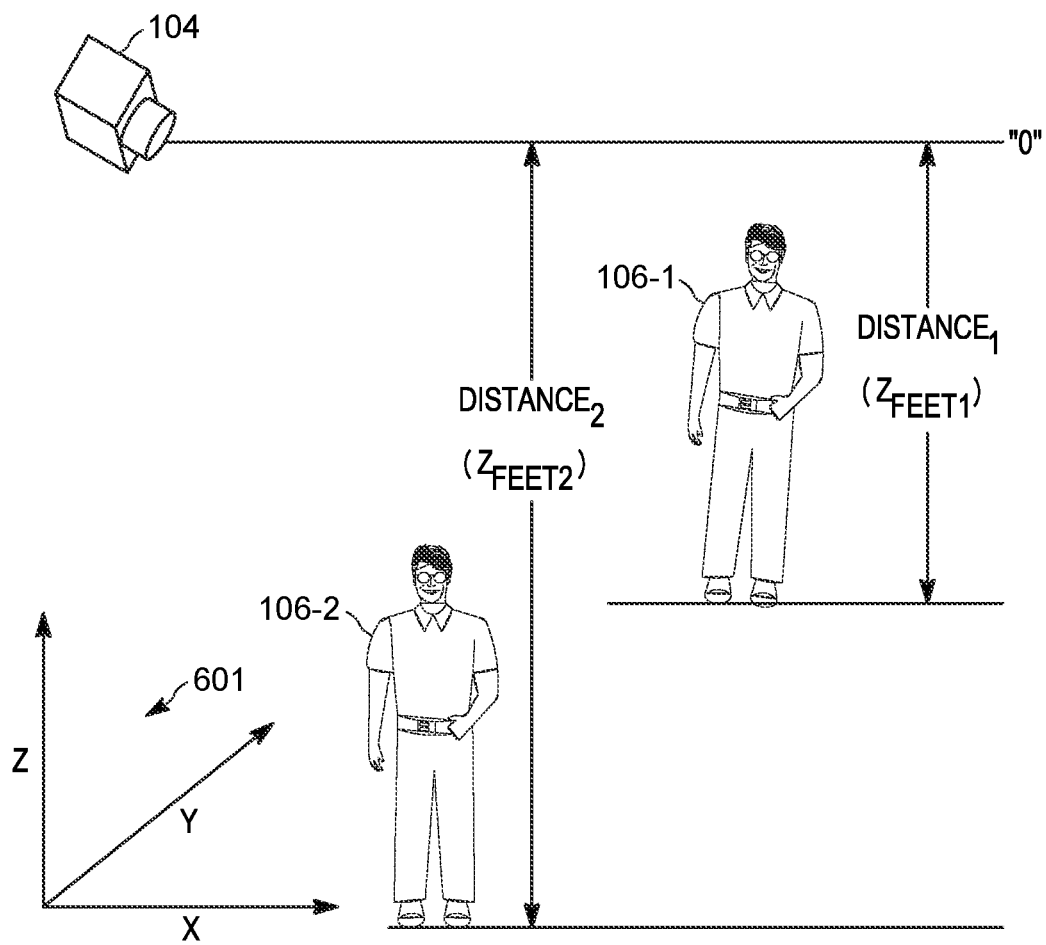
FIG. 6 is an example of relative elevations of humans to a camera device, in accordance with some examples.
Figure 7:
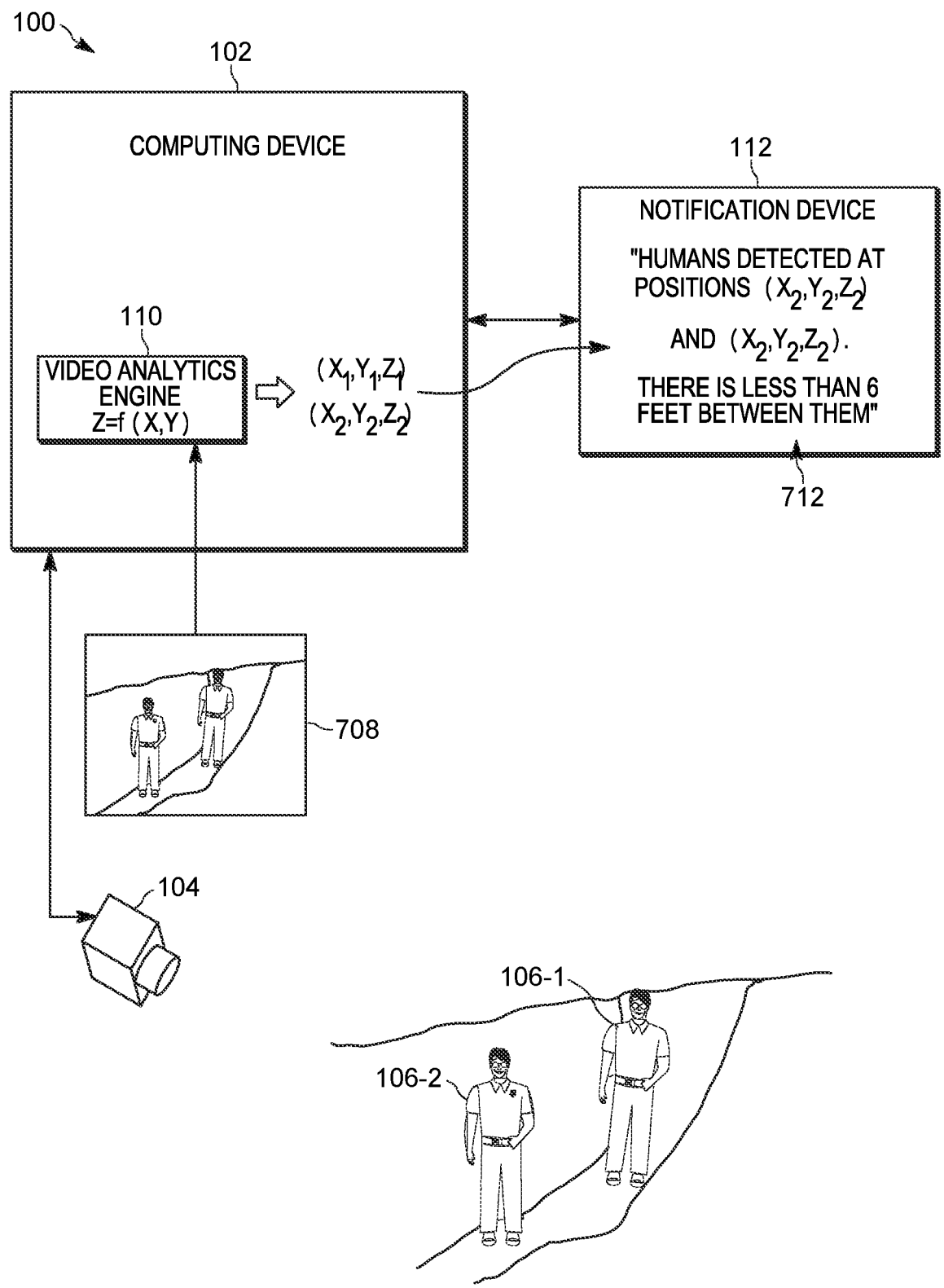
FIG. 7 is an example of a method for estimating elevation in images from camera devices implemented in the system of FIG. 1, in accordance with some examples Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

Furthermore, with the camera device parameters 224 being known and/or predetermined, object localization of the humans 106 in the images 108 may occur, for example to determine respective relative real-world locations of the humans 106 relative to the camera device 104, as also described below with respect to FIG. 4. FIG. 5, FIG. 6 and FIG. 7.

As such, for clarity, hereafter the term "position" will be used to refer to image positions and/or image coordinates, and the term "location" will be used to refer to object localization locations of the humans 106 relative to the camera device 104.

Similarly, for clarity, hereafter, throughout the present specification, coordinates in small letters, such as (x,y) are understood to refer to of image positions and/or image coordinates, whereas coordinates in capital letters, such as (X,Y) and/or (X,Y,Z) are understood to refer to real-world coordinates of real-world locations for example relative to the camera device 104.

At a block 304, the controller 218 and/or the device 102 estimates, for the humans 106 in the images 108, respective elevations of the humans 106, relative to the of the camera device 104, at the respective positions based at least on the camera device parameters 224 defining the fixed orientation and the fixed focal length.

Such respective elevations of the humans 106 are understood to be based on relative real-world locations of the humans 106, for example at respective feet of the humans 106, as the feet of the humans 106 are assumed to be at a real-world location on the unlevel terrain. As such, the respective elevations of the humans 106, relative to the camera device 104, is understood to represent a given elevation of the terrain on which a human 106 is standing, relative to the camera device 104.

In some examples, a position of the camera device 104 is assigned an elevation of "0" such that respective "elevation" positions of the humans 106 are determined relative to the camera device 104 being at an elevation "0"; hence, when the camera device 104 is above the humans 106, respective elevations of the humans 106, relative to the camera device 104, may be negative values.

However, the relative elevations may be determined using any suitable "0" elevation position, and the like, for example relative to the camera device 104.

In particular, such respective elevations are understood to be a vertical distance from, for example, feet of a human 106 to a "0" elevation position, and the like, defined by the camera device 104. Put another way, the respective elevations of the humans 106, relative to the of the camera device 104 does not refer to a feet-to-head height of the humans 106 but rather a vertical distance from feet of a human 106 to the "0" position, and the like, defined by the camera device 104.

Regardless, it is understood that the respective elevations are to same part of a human 106 for which a respective position was determined at the block 302. Hence, for example, when a respective position and/or image coordinate of a human 106 was determined, at the block 302, that corresponds to a position of their feet, the respective elevation of the human 106, determined at the block 304, is also based on a location of their feet. However, while present examples are described with respect to feet of the humans 106, in other examples the respective elevations and respective positions may be based on other body parts, such as their heads, though, when determining elevation at the location, an offset may be applied based on a feet-to-head average height of the humans 106 to locate the elevation at the feet of the humans 106.

Furthermore, estimating the respective elevations of the humans 106, relative to the camera device 104, at the respective positions, may be further based on a feet-to-head homology equation, described in more detail below.

At a block 306, the controller 218 and/or the device 102 associates the respective elevations with the respective positions in the images 108 (e.g. as determined from the same parts of the humans 106, as previously described). Put another way, a respective position for a given human 106 is associated with a respective elevation of the given human 106, both determined with respect to a same body part of the given human 106, such as their feet.

Furthermore, it is understood that, a number of the image coordinates in the images 108 that are assigned a respective elevation value may depend on a number of humans 106 that appear in the images 108, at once and/or over time, with more humans 106 appearing in the images 108 at different positions and/or image coordinates increasing a density of image coordinates for which respective elevations are determined. Such respective elevations, associated with respective image coordinates and/or respective positions in the images 108, hence may represent a map of elevations associated with pixels in the images 108, of the terrain in the region 105 imaged by the camera device 104. Such a map is understood to be different from an elevation map of the terrain in the region 105; rather such a map may comprise elevations of the terrain of the region 105 at different pixels of the images 108.

Furthermore, using, for example, an average feet-to-head human height value, a corresponding elevation of terrain at a respective image position may be estimated.

At a block 308, the controller 218 and/or the device 102 determines, using the respective elevations associated with the respective positions, a function that estimates elevation in an image 108 from the camera device 104, using a respective image position coordinate as an input. For example, as the respective elevations, associated with respective image coordinates and/or respective positions in the images 108, hence may represent a map of elevations to pixels in the images 108, such a function attempts to mathematically define the map of elevations to pixels in the images 108.

Put another way, such a function may comprise any suitable function which uses, as input, an image position coordinate and outputs a respective elevation, for example of terrain in an image. Such a function may comprise one or more of: a deterministic function and a stochastic process function.

In particular, the function may be determined by fitting coefficients, and the like of (x,y) variables thereof to the respective elevations, associated with respective image coordinates and/or respective positions in the images 108, hence may represent a map of elevations to pixels in the images 108.

One example of a deterministic function is a polynomial in the form of $Z=a_n x^n + a_{n-1} x^{n-1} + \ldots ax + b_m y^m + b_{m-1} y^{m-1} + \ldots$ by, where "Z" is an elevation, "x" and "y" represent variable corresponding to image coordinates at an image 108, "n" and "m" comprise respective maximum orders of the (x,y) variables, and "a" and "b" comprise coefficients thereof. Hence, in determining the function, orders and coefficients of the (x,y) variables may be fit to the respective image coordinates (e.g. (x,y) coordinates) and associated respective positions (e.g. "Z" values for the function) determined at the block 306.

Other examples deterministic functions may include, but are not limited to, one or more of polynomial functions, sine functions, cosine functions, spline functions, B-spline functions, and the like.

Examples of stochastic process function may include, but are not limited to, Gaussian process functions, and the like. For example, when, over time, more than one human 106 is determined to be at a same respective position and/or a same image coordinate (e.g. in different images 108 received at the device 102 at different times), and more than one elevation may be determined for the same respective position and/or the same image coordinate; a distribution of such elevations for the respective position and/or the image coordinate may be represented by a respective Gaussian function, with different Gaussian functions associated with different respective position and/or image coordinates.

Regardless, an estimated elevation determined by the function may comprise a respective terrain elevation (e.g. relative real-world location) relative to the camera device 104, at a respective image position of images 108 acquired by the camera device 104.

It is further understood that the function may also be used to estimate elevations at image position coordinates where no humans (and/or none of the humans 106) were detected, however accuracy of such estimated elevations may depend on how close such an image position coordinate is to another image position coordinate at which a human was previously detected.

Regardless, the function is understood to receive, as input, any suitable image position coordinate of an image and return an estimated elevation. When the function is stochastic the estimated elevation may be returned with a confidence level; for example, when the function comprises a Gaussian process function, an estimated elevation for a given image position coordinate may comprise a mean elevation represented by a Gaussian process function of the given image position along with a standard deviation thereof.

In some examples, the controller 218 and/or the device 102 may determine the function only after a given number of humans 106 are detected in the images 108 over time. For example, a function based on two humans 106 (e.g. two data points in a map of elevations to pixels in the images 108) may not be accurate, whereas a function based on 100 or 1000 humans 106 may be considered accurate and/or more accurate. As such, the controller 218 and/or the device 102 may be configured to accumulate respective elevations, associated with respective image coordinates and/or respective positions in the images 108 until a given number (e.g. 100, 1000 and/or any suitable number) is reached and determine the function thereafter.

Furthermore, after the function is determined, the controller 218 and/or the device 102 may continue to refine the function based on further humans 106 detected in further images 108, for example to improve accuracy of the function.

At a block 310, the controller 218 and/or the device 102 provides the function to the video analytics engine 110 to determine relative real-world positions in subsequent images 108 from the camera device 104. Furthermore, when the function is further refined, after being provided to the video analytics engine 110, the controller 218 and/or the device 102 may provide a refined version of the function to the video analytics engine 110.

For example, when a subsequent image 108 is received, the video analytics engine 110 may use the function to determine a relative-real world elevation of a human (e.g. from the camera device 104 to their feet) in subsequent images 108 from the camera device 104, for example by: detecting a human in subsequent images 108; determining a respective position (e.g. image position coordinates) of a bounding box of the human 106 in the subsequent images 108 (e.g. corresponding to feet of the human 106 at the bounding box); and using the image position coordinates of the respective position as input to the function to determine an estimated elevation of terrain at which the human 106 is positioned in the images.

Such estimated elevations may be used to determine different parameters for humans detected in the subsequent images 108. For example, when the estimated elevation of the terrain is determined from the function, and a location of a head of the human in the bounding box is determined, the difference therebetween may correspond to a feet-to-head height of the human. Such a determination may be further based on a feet-to-head homology equation.

The feet-to-head height may be stored at a memory and/or the notification device 112 may be controlled to provide a notification thereof. For example, a first responder and/or police BOLO (e.g. a Be On the Look Out) may be issued for a human of a given feet-to-head height and, when a human of the given feet-to-head height is detected, the notification device 112 may be controlled to provide a notification thereof.

Put another way, the method 300 may further comprise the controller 218 and/or the device 102: estimating, at the video analytics engine 110, using a feet-to-head homology equation and the function that estimates the elevation (e.g. as determined at the block 308), a respective feet-to-head height of a human in a further image from the camera device 104; and one or more of: storing, at a memory, the respective feet-to-head height; and controlling the notification device 112 to provide a notification thereof. A user monitoring the notification device 112 may take a subsequent action, which may include, but is not limited to, requesting, from the computing device 102, the image of the human to compare with a BOLO, and the like and/or searching for the human in the region 105.

In some examples, the video analytics engine 110 may be provisioned with another given function and/or given functions that may be used to determine distances from the camera device 104 associated with respective image position coordinates of the images 108. For example, such a given function may be used to perform object localization of humans 106 in images 108, for example to determine a respective relative real-world locations of the humans 106 relative to the camera device 104. Hence, the given function may be used by the video analytics engine 110 to determine distances of humans 106 from the camera device 104, for example in planar coordinates (e.g. relative real-world (X,Y) coordinates) at a respective position, and the function determined at the block 308 may be used by the video analytics engine 110 to determine an elevation (e.g. a relative real-world "Z" coordinate) at the respective position. Such coordinates may hence be combined, for example into an (X, Y, Z) coordinate and used to determine an elevation map of terrain in a field-of-view of the camera device 104. It is understood that, relative real-world (X,Y) coordinates and/or planar coordinates may be to the same body part of the human 106 used to determine the respective elevations, etc. such as feet.

Put another way, the method 300 may further comprise the controller 218 and/or the device 102: determining, using a given function, distances from the camera device 104 associated with respective image position coordinates of the images 108 (e.g. a real world distance to feet of humans at respective image position coordinates); determining, using the function that estimates the elevation (e.g. as determined at the block 308), elevations associated with the respective image position coordinate of the images 108; and combining the distances with the elevations to determine an elevation map of terrain in a field-of-view of the camera device 104.

A similar technique may be used to determine and/or confirm relative real-world positions of humans in subsequent images 108 received from the camera device 104. For example, the method 300 may further comprise the controller 218 and/or the device 102: receiving, at the video analytics engine 110, a further image 108 from the camera device 104; detecting, using the video analytics engine 110, a human in the further image 108; determining, using the video analytics engine 110, a distance from the human to the camera device 104 in planar coordinates (e.g. (X, Y) coordinates) using a given function; determining, using the video analytics engine 110 and the function that estimates the elevation (e.g. determined at the block 308), the elevation of the human; and combining, using the video analytics engine 110, the planar coordinates with the elevation of the human to determine a relative real-world position of the human in the further image, relative to the camera device 104. While the given function may also be used to determine a "Z" coordinate of the human, the elevation of the human may represent a more accurate indication of the human relative to the terrain at which the human is located.

Indeed, a similar technique may be used to determine and/or confirm relative real-world positions of humans in subsequent images 108 received from the camera device 104. For example, the method 300 may further comprise the controller 218 and/or the device 102: estimating, at the video analytics engine 110, using a given function that estimates distances from the camera device 104, and the function that estimates the elevation, a respective distance between two humans detected in a further image from the camera device 104; and in response to the respective distance being less than a threshold distance, controlling the notification device 112 to provide a notification thereof.

Hence, for example, real world coordinates of the two humans may be determined, using planar coordinates of the humans combined with an elevation of the humans, and such real world coordinates of the two humans may be used to determine a distance therebetween. The distance may be compared to a threshold distance associated, for example, with reducing spread of disease such as Covid-19, and the like; hence, when the distance is less than the threshold distance, the notification device 112 may be controlled to provide a notification of same (e.g. by transmitting a command to the notification device 112 provide a notification). A user monitoring the notification device may take an action to increase the distance between the humans (e.g. by operating a loud speaker, and the like, not depicted, to instruct them to increase their distance; and/or by transmitting respective notifications to mobile devices of the humans, not depicted, to increase their distance; and the like).

Other information about humans that may be determined may include, but are not limited to: measuring a speed of a person, for example by determining their location over time, i.e. using a plurality of images; determining density of groups of persons, and the like.

Examples of the method 300 will next be described with respect to FIG. 4, FIG. 5, FIG. 6 and FIG. 7. In the following discussion, it is understood that the aspects described are performed by the controller 218 and/or the device 102.

Figure 4:
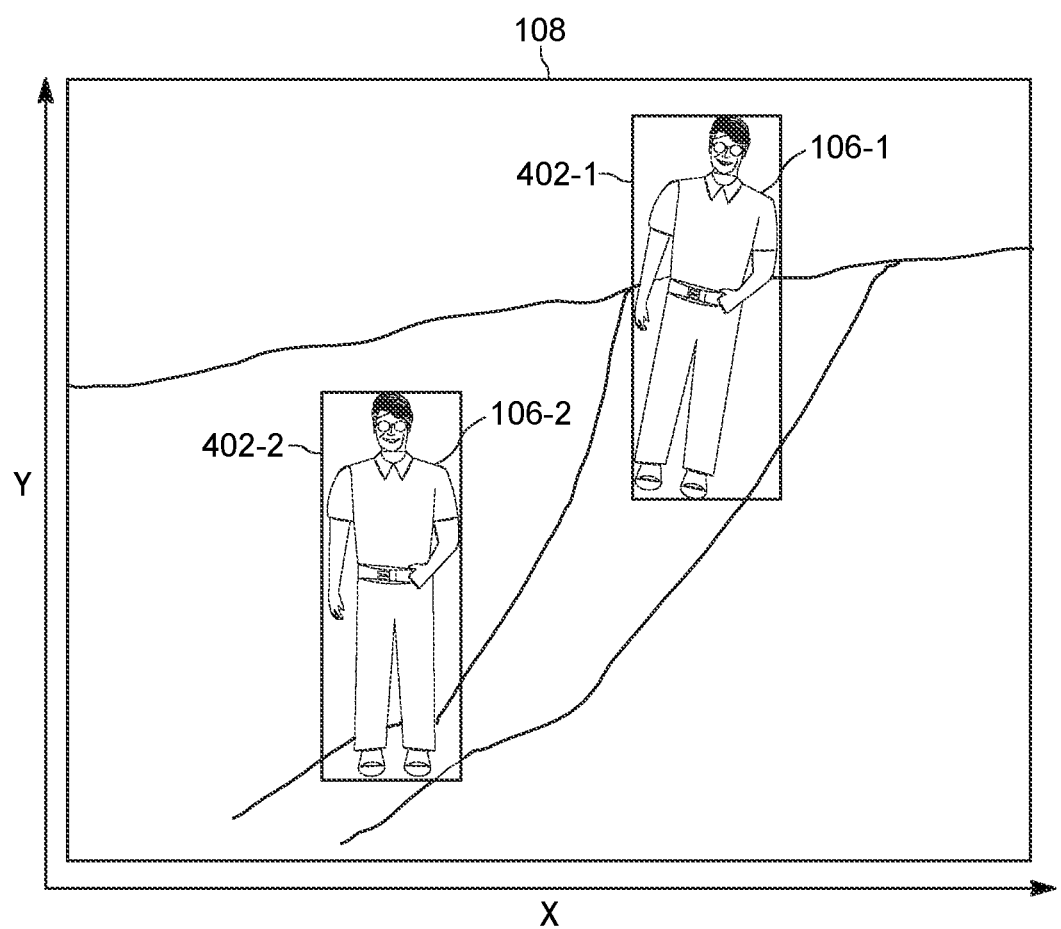
FIG. 4 is an example of an image received in the system of FIG. 1 with bounding boxes around humans, in accordance with some examples.

Attention is first directed to FIG. 4 which depicts an example of an image 108 received at the device 102. Furthermore, as depicted, the device 102 is understood to have detected (e.g. at the block 302 of the method 300) the humans 106-1, 106-2 in the image 108 and placed respective bounding boxes 402-1, 402-2 (e.g. bounding boxes 402 and/or a bounding box 402) around the humans 106-1, 106-2.

For clarity, FIG. 4 also depicts an abscissa (e.g. an "x" axis") and an ordinate (e.g. a "y" axis) of the image 108. Indeed, the measurements referred to herein in relation to the image 108 (e.g. in FIG. 5) may be in pixels, or alternatively can be in measurements such as millimeters, and converted to meters or feet on localization of the image 108.

Figure 5:
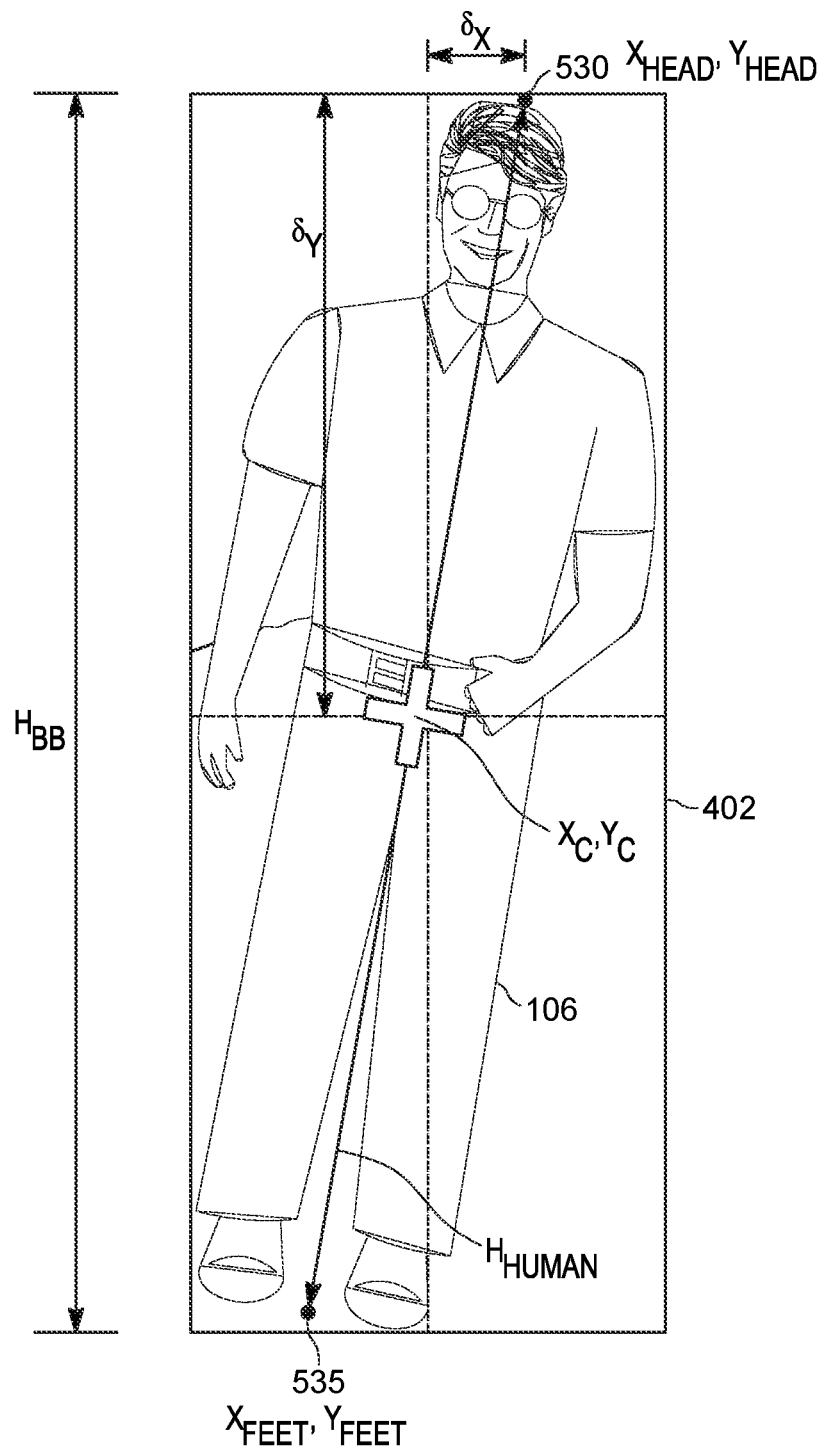
FIG. 5 is an example of a bounding box around a human in the image of FIG. 4, in accordance with some examples.

Referring now to FIG. 5, an example of using a bounding box 402 to perform the block 304 is shown. In particular, in FIG. 5 a portion of the image 108 is depicted that includes a human 106 positioned within a bounding box 402. The human 106 in the bounding box 402 appears at an angle within the bounding box 402 (e.g. like the human 106-1 in the bounding box 402-1), rather than aligned with vertical edges of the bounding box 402, for example due to the distortion intrinsic to optics of the camera device 104 and/or the rotation (e.g. yaw) of the camera device 104 and/or the human 106 being on slanted ground, and the like.

Also depicted are a longitudinal length ($H_{bb}$) of the bounding box 402 and a foot-to-head height ($H_{human}$) of the human 106, which may not be equal due to the slant of the human 106.

Furthermore, centroid coordinates of the bounding box 402 are denoted as ($x_C, y_C$), as are head image coordinates 530 ($x_{Head}, y_{Head}$) of the human 106 and feet image coordinates 535 ($x_{Feet}, y_{Feet}$) of the human 106. The head image coordinates 530 and the feet image coordinates 535 may be approximated, for example, by detecting a top of the head of the human 106 and the feet of the human 106 using any suitable video analysis technique.

As also shown in FIG. 5, $\delta_x$ represents a distance of $x_{head}$ from $x_c$, and $\delta_y$ represents the distance from $y_{head}$ to $y_c$. $\delta_x$ and $\delta_y$ (e.g. determined by the device 102) therefore represent the "slant" of the feet image coordinates 535 ($x_{Feet}, y_{Feet}$) to the head image coordinates 530 ($x_{Head}, y_{Head}$) relative to the bounding box 402.

A line segment human model can be used to model a position of the human 106 within the bounding box 402, and is referred to as a "slant model". The locations of the head image coordinates 530 and feet image coordinates 535 can be mapped using a feet-to-head homology equation:

$$H \begin{bmatrix} x_{feet} \\ y_{feet} \\ 1 \end{bmatrix} = w \begin{bmatrix} x_{head} \\ y_{head} \\ 1 \end{bmatrix} \quad \text{Equation (1)}$$

In Equation (1) (i.e. the feet-to-head homology equation), "w" is a scalar and "H" is understood to be (e.g. where "T" denotes a matrix transpose operator):

$$H = \left( I - \frac{H_{human}}{H_{cam}} \frac{p_2(p_0 \times p_1)^T}{p_2^T(p_0 \times p_1)} \right) \quad \text{Equation (2)}$$

Equation (2) is understood to comprise a homology matrix that depends on the real world elevation of the camera ($H_{cam}$) above a horizontal plane on which the feet of human 106 lie, and the camera parameters 224 such as camera focal length (f), roll (θ), and pitch (ρ), as well as real-world feet-to-head human height $H_{human}$, and in which $p_0, p_1, p_2$ are the first three columns of a homography projection matrix P:

$$P = \begin{bmatrix} f\cos\rho & -f\sin\rho\cos\theta & f\sin\rho\sin\theta & -fH_{cam}\sin\rho\sin\theta \\ f\sin\rho & f\cos\rho\cos\theta & -f\cos\rho\sin\theta & fH_{cam}\cos\rho\sin\theta \\ 0 & \sin\theta & \cos\theta & -H_{cam}\cos\theta \end{bmatrix} \quad \text{Equation (3)}$$

The feet-to-head homology Equation (1) is understood to map the feet image coordinates 535 ($x_{Feet}, y_{Feet}$) to the head image coordinates 530 ($x_{Head}, y_{Head}$) of the human 106, whose real world feet-to-head height is $H_{human}$. In particular, it is understood that a distance the feet image coordinates 535 ($x_{Feet}, y_{Feet}$) to the head image coordinates 530 ($x_{Head}, y_{Head}$) is in pixels, and the like, of the image 108, while a real world feet-to-head height, $H_{human}$ of the human 106 is in meters, and the like (e.g. a distance in pixels in an image from feet-to-head vs a real world feet-to-head height).

Such a slant model is understood to model the locations of the feet and head of the human 106 in the bounding box 402 as:

($x_c, y_c$): centroid image coordinates
($x_c-\delta_x, y_c-\delta_y$): feet image coordinates
($x_c+\delta_x, y_c+\delta_y$): head image coordinates Incorporating the slant model into the feet-to-head homology formula (Equation (1)) yields:

$$H \begin{bmatrix} x_c - \delta_x \\ y_c - \delta_y \\ 1 \end{bmatrix} = w \begin{bmatrix} x_c + \delta_x \\ y_c + \delta_y \\ 1 \end{bmatrix} \quad \text{Equation (4)}$$

In cases in which the detected bounding boxes 402 are free of noise and the human's real world feet-to-head height, $H_{human}$, is known, Equation (4), which may be referred to as a slant model homology equation, will hold exactly. In practice, bounding boxes may be noisy, or the real world human feet-to-head height may not be known exactly (e.g. an average human feet-to-head height may be used as $H_{human}$, such as 1.6 meters, 1.7 meters, and the like, and/or the average feet-to-head human height may be selected geographically, depending on a geographic region in which the camera device 104 is deployed). In these cases, the homology Equation (4) holds approximately within a reasonable margin of error.

Furthermore, it is understood that, when a human 106 is not slanted in a bounding box 402, $\delta_x=0$ and $\delta_y=H_{bb}/2$.

In any event, the device 102 may obtain, from Equation (4) slant values ($\delta_{x,k}, \delta_{y,k}$) and the like, for each of "k" bounding boxes 402, given the parameters $H_{cam}$, f, θ, ρ. The slant values ($\delta_{x,k}, \delta_{y,k}$) can either be computed for each bounding box 402 as it is detected; or the slant values ($\delta_{x,k}, \delta_{y,k}$) can be precomputed for a plurality of pixels in a grid of pixel locations within the field-of-view of the camera device 104, and the slant values ($\delta_{x,k}, \delta_{y,k}$) associated with the pixel that is closest to the detection centroid (xc, yc) of the bounding box 402 may be retrieved and used at runtime.

Feet and head image points for each of "k" bounding boxes 402 then be determined, using the slant values ($\delta_{x,k}, \delta_{y,k}$) as described above. A human 106 associated with a bounding box 402 may then be localized using homography projection equations for the bounding box 402 as follows:

$$\begin{bmatrix} x_c - \delta_x \\ y_c - \delta_y \\ 1 \end{bmatrix} w = P \begin{bmatrix} X \\ Y \\ Z_{Feet} \\ 1 \end{bmatrix} \text{ and} \quad \text{Equation (5)}$$

$$\begin{bmatrix} x_c + \delta_x \\ y_c + \delta_y \\ 1 \end{bmatrix} w = P \begin{bmatrix} X \\ Y \\ Z_{Feet} + H_{human} \\ 1 \end{bmatrix} \quad \text{Equation (6)}$$

In Equation (5) and Equation (6) (X,Y) represent the real-world planar coordinates of the human 106 relative to the camera device 104. However, in Equation (5), a "vertical coordinate" $Z_{Feet}$ is determined relative to a reference plane on which the camera device 104 is located and assumes that feet of the human 106 are at a plane that is a vertical distance $Z_{Feet}$ from the reference plane, while in Equation (6), "vertical coordinate" $Z_{Feet}+H_{Human}$ assumes that the head of the human 106 is at a plane that is a vertical distance $Z_{Feet}+H_{Human}$ from the reference plane. By default, the vertical coordinate of the reference plane on which the camera device 104 is located may be set to 0, and $Z_{Feet}$ may be a negative value if the feet of the human 106 are below the reference plane. For "P", in Equations 5 and 6, and using a definition of P defined in Equation (3), which depends on the parameter $H_{cam}$, the value of $H_{cam}$ is the negative of $Z_{Feet}$. The "vertical coordinate" $Z_{Feet}$ may be used as the estimation (e.g. at the block 304 of the method 300) of the, respective elevations of the humans 106 for a given bounding box 402, relative to the camera device 104, at a respective position of the image 108.

Hence, for each human 106 detected in an image 108, a respective elevation $Z_{Feet}$ relative to the camera device 104 may be determined (which may be a negative value), and associated (e.g. at the block 306) with a respective position in the image (e.g. the feet image coordinates 535 ($x_{Feet}$, $y_{Feet}$)).

For example, attention is directed to FIG. 6 which depicts respective elevations $Z_{Feet}$ of the humans 106 relative to a "Z" position of the camera device 104 (e.g. $H_{cam}$) being set to "0", with a respective vertical Distance$_1$ (e.g. a respective elevation) of the human 106-1 being $Z_{Feet1}$, and a respective vertical Distance$_2$ (e.g. a respective elevation) of the human 106-2 being $Z_{Feet2}$. For clarity an XYZ coordinate system 601 is also depicted. Comparing the XYZ coordinate system 601 to the abscissa and ordinate of the image 108 in FIG. 4, it is understood that the "X" of the XYZ coordinate system 601 may correspond to the abscissa of the image 108, and the "Z" of the XYZ coordinate system 601 may correspond to the ordinate of the image 108.

Hence, a plurality of respective elevations $Z_{Feet}$ relative to the camera device 104 with associated feet image coordinates ($x_{Feet}$, $y_{Feet}$) may be determined, for example by solving Equation (4) for $H_{cam}$, $d_x$ and w (e.g. from Equation (1)), and used to determine (e.g. at the block 308 of the method 300) a function, as described previously (e.g. by fitting the plurality of respective elevations $Z_{Feet}$ and associated with feet image coordinates ($x_{Feet}$, $y_{Feet}$) to coefficients of polynomials and/or determining Gaussian distributions at respective elevations $Z_{Feet}$ at given feet image coordinates ($x_{Feet}$, $y_{Feet}$), and the like):

$$Z=f(x,y) \quad \text{Equation (7)}$$

In Equation (7), "Z" is an elevation of terrain in an image 108, acquired by the camera device 104, (x,y) is a given image coordinate associated with a bounding box 402, such as the centroid of the bounding box 402, and "f" is the function that outputs an elevation using a given image coordinate as an input. Furthermore, examples of Z=f(x,y) are described above, and may include deterministic and/or stochastic functions.

Equation (7) may be provided (e.g. at the block 310 of the method 300) to the video analytics engine 110 to determine elevations of humans in subsequent images received from the camera device 104. For example, in such subsequent images, bounding boxes of humans may be determined to determine feet image coordinates ($x_{Feet}$, $y_{Feet}$) using the slant model described above or, when a human 106 is not slanted in a bounding box 402, a conventional model. The feet image coordinates ($x_{Feet}$, $y_{Feet}$) may be input into the function of Equation (7) to return an elevation thereof.

For example attention is next directed to FIG. 7 which is substantially similar to FIG. 1, with like components having like numbers; however, in FIG. 7, it is understood that the video analytics engine 110 has been provided with a function Z=f(x,y). Furthermore, in FIG. 7, the humans 106 have moved and the camera device 104 acquires an image 708 thereof which is provided to the computing device 102 and, in particular, the video analytics engine 110. The video analytics engine 110 may determine their feet image coordinates in the image 708 and, using the function Z=f(x,y), output respective elevations $Z_1$, $Z_2$ thereof. As depicted, the video analytics engine 110 may further determine real world "X" and "Y" positions of the humans 106 (e.g. ($X_1$, $Y_1$) and ($X_2$, $Y_2$), respectively), for example using Equation (5), and combine with the respective elevations $Z_1$, $Z_2$ to, for example, perform a real world localization of the humans 106 relative to the camera device 104. As depicted, the video analytics engine 110 may output the respective real world coordinates ($X_1$, $Y_1$, $Z_1$) and ($X_2$, $Y_2$, $Z_2$) to the notification device 112 and/or a distance therebetween, which provides a notification 712 thereof of "Humans Detected At Positions ($X_2$, $Y_2$, $Z_2$) and ($X_2$, $Y_2$, $Z_2$). There is less than 6 Feet Between Them". In particular, the distance between the humans 106 may be determined at the computing device 102 and/or the notification device 112, and the like, from the respective real world coordinates ($X_1$, $Y_1$, $Z_1$) and($X_2$, $Y_2$, $Z_2$).

While such an example is simplistic, it is provided to show that a notification based on elevations determined using the function Z=f(x,y) may be provided, however any suitable determination about the humans 106 in the image 708 may be made using the function Z=f(x,y) and a notification thereof provided, as described above. For example, respective real world coordinates of the humans 106 may be determined over time to determine respective walking speeds, and the like, thereof.

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot estimate elevation in images from camera devices, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   detecting, at a computing device, humans at respective positions in images from a camera device, the camera device having a fixed orientation and fixed focal length;
   estimating, at the computing device, for the humans in the images, respective elevations of the humans, relative to the camera device, at the respective positions based at least on camera device parameters defining the fixed orientation and the fixed focal length;
   associating, at the computing device, the respective elevations with the respective positions in the images;
   determining, at the computing device, using the respective elevations associated with the respective positions, a function that estimates elevation in an image from the camera device, using a respective image position coordinate as an input;

providing the function to a video analytics engine to determine relative real-world positions in subsequent images from the camera device;

determining, using a given function, distances from the camera device associated with respective image position coordinates of the images;

determining, using the function that estimates the elevation, elevations associated with the respective image position coordinate of the images; and combining the distances with the elevations to determine an elevation map of terrain in a field-of-view of the camera device.

2. The method of claim 1, wherein, the camera device parameters defining the fixed orientation and the fixed focal length comprise at least a pitch value of the camera device, a roll value of the camera device and a fixed focal length value of the camera device.

3. The method of claim 1, wherein the detecting the humans at the respective positions in the images occurs using bounding boxes and further includes determining head image coordinates and feet image coordinates of the humans in the bounding boxes.

4. The method of claim 1, wherein the estimating the respective elevations of the humans, relative to the camera device, at the respective positions is further based on a feet-to-head homology equation.

5. The method of claim 1, wherein the function that estimates the elevation in the image from the camera device, using the respective image position coordinate as the input, comprises one or more of: a deterministic function and a stochastic process function.

6. The method of claim 1, further comprising:
estimating, using the function, the elevation at the respective image position coordinates where none of the humans were detected.

7. The method of claim 1, further comprising:
receiving, at the video analytics engine, a further image from the camera device;
detecting, using the video analytics engine, a human in the further image;
determining, using the video analytics engine, a distance from the human to the camera device in planar coordinates using the given function;
determining, using the video analytics engine and the function that estimates the elevation, the elevation of the human; and
combining, using the video analytics engine, the planar coordinates with the elevation of the human to determine a relative real-world position of the human in the further image, relative to the camera device.

8. The method of claim 1, further comprising:
estimating, at the video analytics engine, using a feet-to-head homology equation and the function that estimates the elevation, a respective elevation of a human in a further image from the camera device; and one or more of:
storing, at a memory, the respective elevation; and
controlling a notification device to provide a notification thereof.

9. The method of claim 1, further comprising:
estimating, at the video analytics engine, using the given function that estimates the distances from the camera device, and the function that estimates the elevation, a respective distance between two humans detected in a further image from the camera device; and
in response to the respective distance being less than a threshold distance, controlling a notification device to provide a notification thereof.

10. A device comprising:
a controller communicatively coupled to a camera device, the controller configured to:
detect humans at respective positions in images from the camera device, the camera device having a fixed orientation and fixed focal length;
estimate, for the humans in the images, respective elevations of the humans, relative to the camera device, at the respective positions based at least on camera device parameters defining the fixed orientation and the fixed focal length;
associate the respective elevations with the respective positions in the images;
determine, using the respective elevations associated with the respective positions, a function that estimates elevation in an image from the camera device, using a respective image position coordinate as an input;
provide the function to a video analytics engine to determine relative real-world positions in subsequent images from the camera device,
determine, using a given function, distances from the camera device associated with respective image position coordinates of the images;
determine, using the function that estimates the elevation, elevations associated with the respective image position coordinate of the images; and
combine the distances with the elevations to determine an elevation map of terrain in a field-of-view of the camera device.

11. The device of claim 10, wherein, the camera device parameters defining the fixed orientation and the fixed focal length comprise at least a pitch value of the camera device, a roll value of the camera device and a fixed focal length value of the camera device.

12. The device of claim 10, wherein the controller is further configured to detect the humans at the respective positions in the images using bounding boxes and by determining head image coordinates and feet image coordinates of the humans in the bounding boxes.

13. The device of claim 10, wherein the controller is further configured to estimate the respective elevations of the humans, relative to the camera device, at the respective positions further based on a feet-to-head homology equation.

14. The device of claim 10, wherein the function that estimates the elevation in the image from the camera device, using the respective image position coordinate as the input, comprises one or more of: a deterministic function and a stochastic process function.

15. The device of claim 10, wherein the controller is further configured to:
estimate, using the function, the elevation at the respective image position coordinates where none of the humans were detected.

16. The device of claim 10, further comprising the video analytics engine, video analytics engine configured to:
receive a further image from the camera device;
detect a human in the further image;
determine a distance from the human to the camera device in planar coordinates using the given function;

determine, using the function that estimates the elevation, the elevation of the human; and combine the planar coordinates with the elevation of the human to determine a relative real-world position of the human in the further image, relative to the camera device.

17. The device of claim 10, further comprising the video analytics engine, video analytics engine configured to:

estimate, using a feet-to-head homology equation and the function that estimates the elevation, a respective elevation of a human in a further image from the camera device; and one or more of:

store, at a memory, the respective elevation; and control a notification device to provide a notification thereof.

18. The device of claim 10, further comprising the video analytics engine, video analytics engine configured to:

estimate, using the given function that estimates distances from the camera device, and the function that estimates the elevation, a respective distance between two humans detected in a further image from the camera device; and in response to the respective distance being less than a threshold distance, control a notification device to provide a notification thereof.

19. A method comprising:

detecting, at a computing device, humans at respective positions in images from a camera device, the camera device having a fixed orientation and fixed focal length;

estimating, at the computing device, for the humans in the images, respective elevations of the humans, relative to the camera device, at the respective positions based at least on camera device parameters defining the fixed orientation and the fixed focal length;

associating, at the computing device, the respective elevations with the respective positions in the images; determining, at the computing device, using the respective elevations associated with the respective positions, a function that estimates elevation in an image from the camera device, using a respective image position coordinate as an input;

providing the function to a video analytics engine to determine relative real-world positions in subsequent images from the camera device; and one or more of:

a) receiving, at the video analytics engine, a further image from the camera device; detecting, using the video analytics engine, a human in the further image; determining, using the video analytics engine, a distance from the human to the camera device in planar coordinates using a given function; determining, using the video analytics engine and the function that estimates the elevation, the elevation of the human; and combining, using the video analytics engine, the planar coordinates with the elevation of the human to determine a relative real-world position of the human in the further image, relative to the camera device;

b) estimating, at the video analytics engine, using a feet-to-head homology equation and the function that estimates the elevation, a respective elevation of a human in a further image from the camera device; and one or more of: storing, at a memory, the respective elevation; and controlling a notification device to provide a notification thereof; and c) estimating, at the video analytics engine, using the given function that estimates distances from the camera device, and the function that estimates the elevation, a respective distance between two humans detected in a further image from the camera device; and in response to the respective distance being less than a threshold distance, controlling a notification device to provide a notification thereof.

* * * * *